US011015920B2

(12) United States Patent
Feero et al.

(10) Patent No.: US 11,015,920 B2
(45) Date of Patent: May 25, 2021

(54) WHEEL BALANCER SYSTEM WITH HOOD MOUNTED MEASUREMENT SENSORS

(71) Applicant: Hunter Engineering Company, Bridgeton, MO (US)

(72) Inventors: William B. Feero, St. Louis, MO (US); Joel A. Clasquin, Highland, IL (US)

(73) Assignee: HUNTER ENGINEERING COMPANY, St. Louis, MO (US)

( * ) Notice: Subject to any disclaimer, the term of this patent is extended or adjusted under 35 U.S.C. 154(b) by 0 days.

(21) Appl. No.: 16/642,761

(22) PCT Filed: Aug. 31, 2018

(86) PCT No.: PCT/US2018/049176
§ 371 (c)(1),
(2) Date: Feb. 27, 2020

(87) PCT Pub. No.: WO2019/050799
PCT Pub. Date: Mar. 14, 2019

(65) Prior Publication Data
US 2020/0191561 A1 Jun. 18, 2020

Related U.S. Application Data

(60) Provisional application No. 62/554,214, filed on Sep. 5, 2017.

(51) Int. Cl.
*G01B 11/24* (2006.01)
*G01B 11/02* (2006.01)
(Continued)

(52) U.S. Cl.
CPC ............ *G01B 11/24* (2013.01); *G01B 11/026* (2013.01); *G01M 1/02* (2013.01); *G01M 1/28* (2013.01); *G01M 1/326* (2013.01)

(58) Field of Classification Search
CPC .......... G01M 1/326; G01M 1/02; G01M 1/16; G01M 17/022; G01M 1/06; G01M 17/027;
(Continued)

(56) References Cited

U.S. PATENT DOCUMENTS 5,189,912 A * 3/1993 Quinlan .................. G01M 1/02
73/462
7,199,873 B2 * 4/2007 Braghiroli ............. G01M 1/225
356/139.04
(Continued)

FOREIGN PATENT DOCUMENTS

WO 9810261 A1 3/1998

OTHER PUBLICATIONS

International Search Report for corresponding PCT/US2018/049176 dated Nov. 12, 2018.
(Continued)

*Primary Examiner* — Michael P Stafira
(74) *Attorney, Agent, or Firm* — Sandberg Phoenix & von Gontard, P.C.

(57) ABSTRACT

An apparatus and method for use with a vehicle wheel balancing system (100) to obtain non-contact measurements of dimensions on a wheel assembly (200) secured on a spindle shaft (104), together with identification of, and distances to, operator-selected locations on various surfaces of a wheel assembly 200.

20 Claims, 8 Drawing Sheets

(51) Int. Cl.
*G01M 1/02* (2006.01)
*G01M 1/28* (2006.01)
*G01M 1/32* (2006.01)

(58) Field of Classification Search
CPC ...... G01M 1/045; G01M 1/225; G01M 17/02; G01M 17/021; G01M 1/36; G01M 17/00; G01M 17/013; G01M 17/025; G01M 1/08; G01M 1/26; G01M 1/28; G01M 1/365; G01M 3/3218; G01M 13/028; G01M 13/045; G02B 26/105; G02B 26/008; G02B 19/0014; G02B 19/0057; G02B 27/0955; G01B 11/22; G01B 11/2755; G01B 11/02; G01B 11/026; G01B 11/24; G01B 11/2513; G01B 11/275; G01B 17/06; G01B 21/02; G01B 21/10; G01B 21/20; G01B 2210/22; G01B 2210/286; G01B 2210/12; G01B 2210/303; G01B 11/25; G01B 11/2518; G01B 11/272; G01B 2210/143; G01B 2210/16; G01B 2210/28; G01B 2210/30; G01N 21/8806; G01N 21/95
See application file for complete search history.

(56) References Cited

U.S. PATENT DOCUMENTS

| | | | |
|---|---|---|---|
| 2004/0165180 A1* | 8/2004 | Voeller | G01M 1/02 356/139.09 |
| 2010/0139398 A1* | 6/2010 | Matteucci | G01M 1/045 73/466 |
| 2015/0185106 A1* | 7/2015 | Magnani | G01M 17/013 29/407.01 |
| 2020/0041373 A1* | 2/2020 | Buzzi | G01M 1/326 |

OTHER PUBLICATIONS

Written Opinion for corresponding PCT/US2018/049176 dated Nov. 12, 2018.

* cited by examiner

WHEEL BALANCER SYSTEM WITH HOOD MOUNTED MEASUREMENT SENSORS

CROSS-REFERENCE TO RELATED APPLICATIONS

The present application is the US National Stage under 35 U.S.C. § 371 et. seq. of International Application No. PCT/US2018/049176, filed on Aug. 31, 2018 which is related to, and claims priority from, U.S. Provisional Patent Application Ser. No. 62/554,214 filed on Sep. 5, 2017, herein incorporated by reference.

STATEMENT REGARDING FEDERALLY SPONSORED RESEARCH

Not Applicable.

BACKGROUND OF THE INVENTION

The present application is related generally to a method and apparatus for identifying and measuring the location of imbalance correction planes on a vehicle wheel assembly mounted for rotation about a spindle shaft of a wheel balancing system, and in particular, towards a method and an apparatus for optically identifying and measuring the location of both an inner and an outer imbalance correction plane on the vehicle wheel assembly.

During balance measurement and imbalance correction for a vehicle wheel assembly consisting of a tire mounted to a wheel rim, it is necessary to identify the intended imbalance correction planes of the wheel assembly in which imbalance correction weights will be applied to the wheel rim. Conventionally, with a wheel assembly secured to a spindle shaft of a wheel balancing system, direct measurements of the wheel rim dimensions are acquired by means of a mechanical measuring tool. These measurements are typically acquired via a caliper-style tool and then input into the wheel balancing system, or by measuring a displacement of a mechanical indicator from a reference or home location when positioned in contact with a selected location on the wheel rim surface.

Non-contact measurements systems have been developed which utilize optical or acoustical sensors to scan the contours of the wheel rim. For example, optical triangulation sensors have been configured with a laser emitter and an associated optical receiver to automatically scan an illuminated laser point across the surface of the wheel rim. The laser is rotated about a pivot axis, while synchronously rotating the optical receiver about the same pivot axis to record the resulting reflected light. Processing of the observed location of the reflected light on the optical receiver using trigonometric algorithms yields a representation of displacement between the optical receiver and the illuminated laser point, from which a profile of the wheel rim surface is established and conveyed to the wheel balancer controller for further evaluation and selection of imbalance correction weight placement locations.

Non-contact measurement systems which scan the contours of a wheel rim secured on a balancer spindle shaft typically require specialized computer software for interpreting the scanned wheel assembly contours, and accompanying hardware, including drive motors, controllers, and rotational position encoders. Accordingly, it would be advantageous to provide a vehicle wheel balancing system with a simplified non-contact measurement system capable of providing basic wheel rim dimensional data as well as measurement data associated with operator-selected locations on the wheel rim surface.

BRIEF SUMMARY OF THE INVENTION

Briefly stated, the present disclosure sets forth an apparatus and method for use with a vehicle wheel balancing system to obtain non-contact measurements of basic wheel rim dimensions and distances to operator-selected locations on a surface of a wheel assembly secured to a spindle shaft of the wheel balancing system.

In one embodiment of the present disclosure, a vehicle wheel balancing system having a spindle shaft for receiving a vehicle wheel assembly is provided with a non-contact measurement system to acquire measurement data associated with the inner (balancer facing) surfaces of a wheel assembly secured on the spindle shaft. The non-contact measurement system includes a fixed imaging sensor operating in conjunction with a laser emitter mounted for independent rotation about an axis. An adjustment knob coupled to the laser emitter facilitates manual rotation of the laser emitter about the rotation axis, enabling an operator to orient an emitted laser beam to strike a selected location on the wheel assembly inner surface within a laser beam emission plane. Observations by the fixed imaging sensor of the laser light reflected from the selected location are processed to triangulate a distance from the fixed imaging sensor to the illuminated point on the wheel assembly inner surface. The determined distance, which may be represented as a voltage, together with the known geometric arrangement of the laser emitter, imaging sensor, and spindle shaft axis, provides an identification of an imbalance correction plane for the wheel assembly selected by the operator.

In a further embodiment, a vehicle wheel balancing system having a spindle shaft for receiving a vehicle wheel assembly, together with a protective hood structure configured to open and close by arcuate movement about a support axis to partially enclose a wheel assembly secured to the spindle shaft during rotation, is provided with a non-contact measurement system to acquire measurement data associated with the wheel assembly outer surfaces (i.e., surfaces opposite from the balancer). The non-contact measurement system includes a displacement sensor assembly consisting of a laser emitter and imaging sensor secured in a fixed relationship on the protective hood structure. The laser emitter is orientated to emit a laser beam towards the wheel assembly outer surface as the protective hood structure traverses an arcuate path between an open position and a closed position, such that an illuminated point of laser light traverses across the outer surfaces of the wheel assembly, including a transition between a tire sidewall and wheel rim edge. Observations of the laser light reflected to the associated imaging sensor received are processed to triangulate a distance from the imaging sensor to the illuminated point on the wheel assembly outer surface. The observations may be acquiring over a range of arcuate movement for the hood structure, establishing a contour of the wheel assembly outer surface, or may be acquired when the hood structure is moved at a selected angular orientation, establishing a distance to a specific location on the wheel assembly surface, such as an installation plane for an outer clip-style imbalance correction weight.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Figure 1:
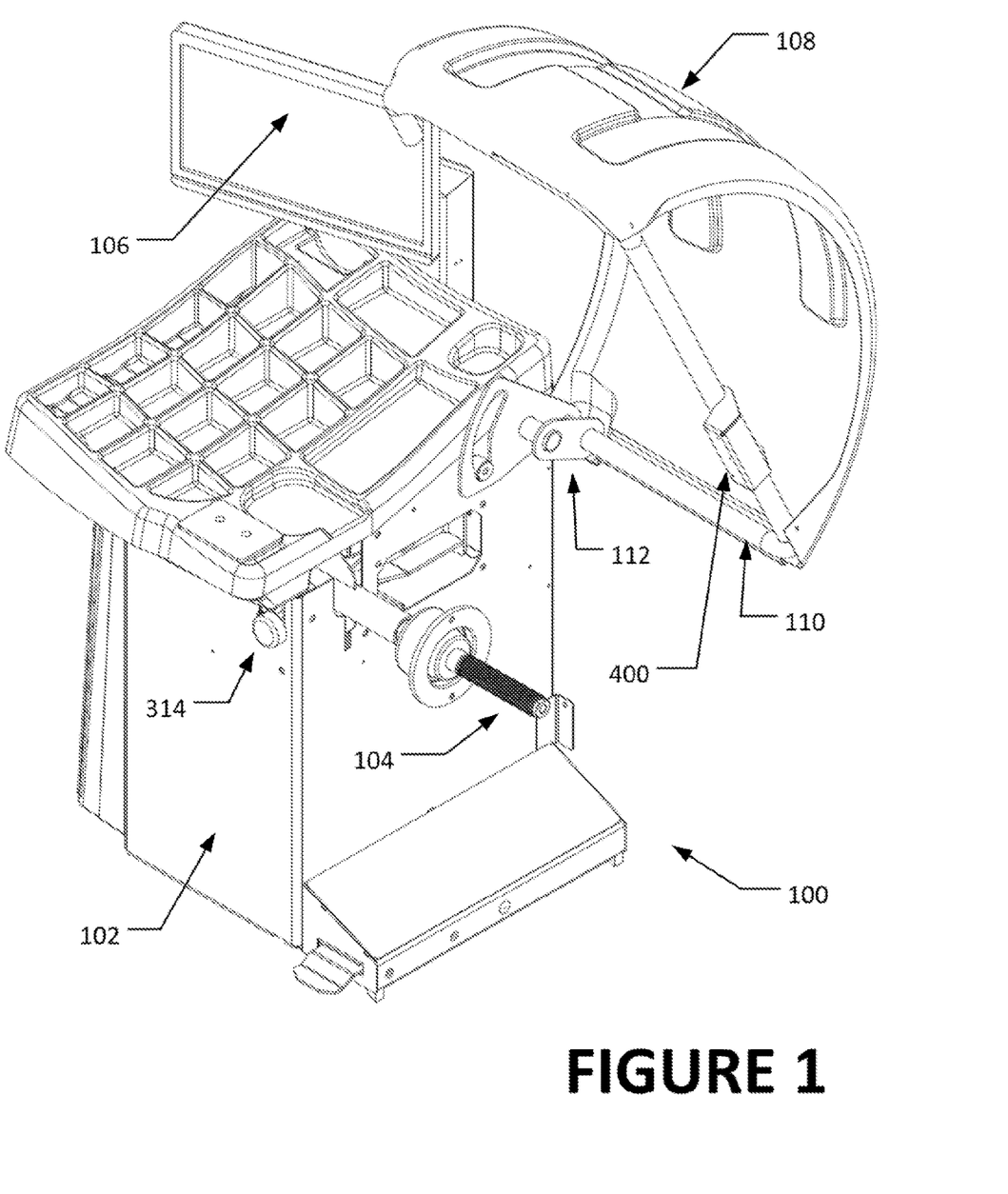
FIG. 1 is a perspective view of a wheel balancer system of the present disclosure.

Turning to the figures, a vehicle wheel balancing system 100 is shown consisting of a base or tub 102 supporting a spindle shaft 104 for receiving a vehicle wheel assembly W. Conventional drive systems (not shown) for rotationally driving the spindle shaft 104 are disposed within the base or tub 102, together with various well understood vibration sensors or transducers and associated support structures (not shown) for measuring imbalances forces exerted by the vehicle wheel assembly 200, consisting of a tire 200a and rim 200b, on the spindle shaft 104 during rotation. Electronic circuits comprising control logic for the vehicle wheel balancing system 100, including various input and output functionality, are additionally disposed within the base or tub 102, and are operatively coupled to appropriate conventional interface 106 devices such as foot pedals, operator controls, one or more display device(s), and optional network connections.

Figure 2:
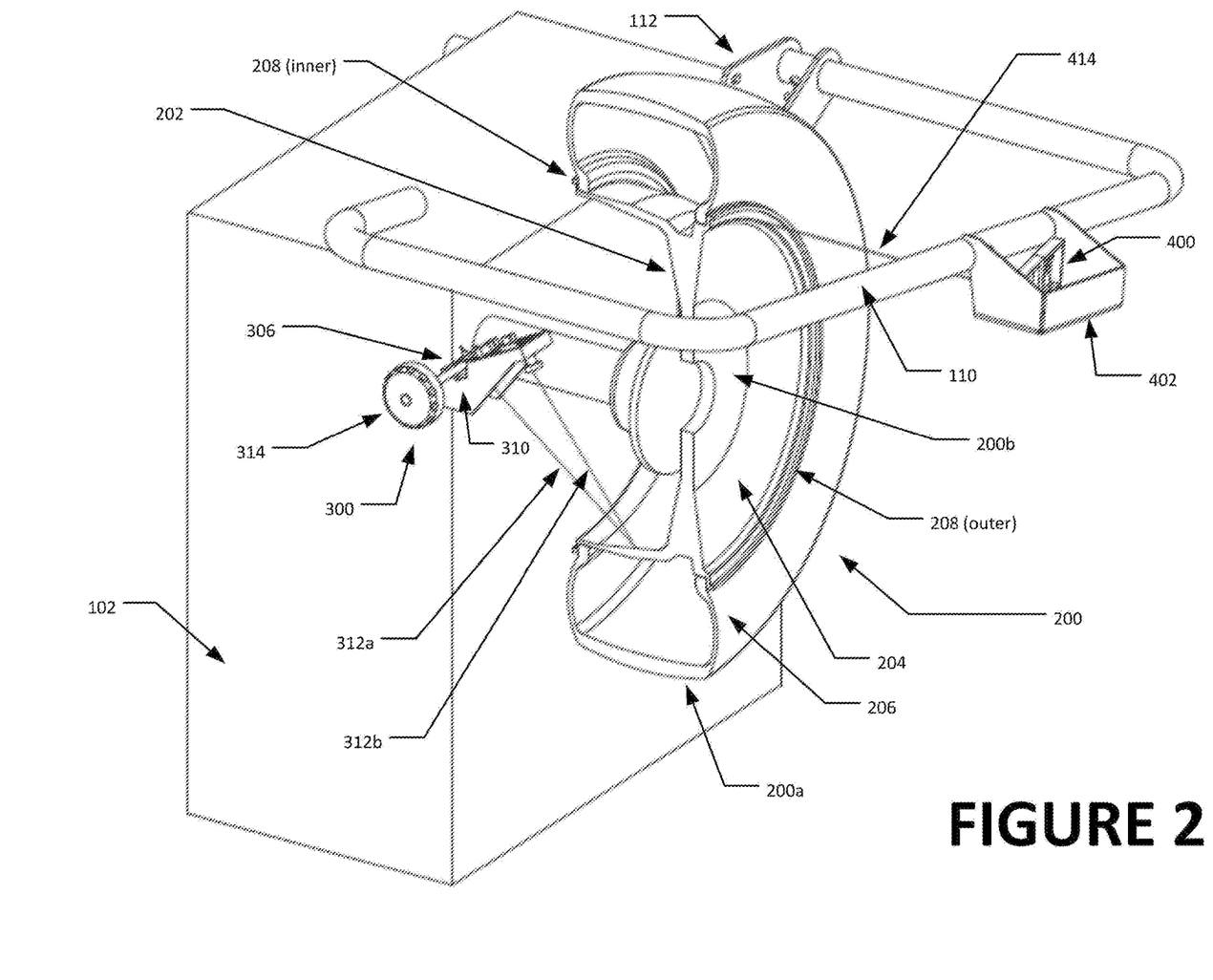
FIG. 2 is a simplified perspective view of a wheel assembly secured to the spindle shaft of a wheel balancer of the present disclosure, illustrating the spatial relationship between the wheel assembly and the various sensors.
Figure 3:
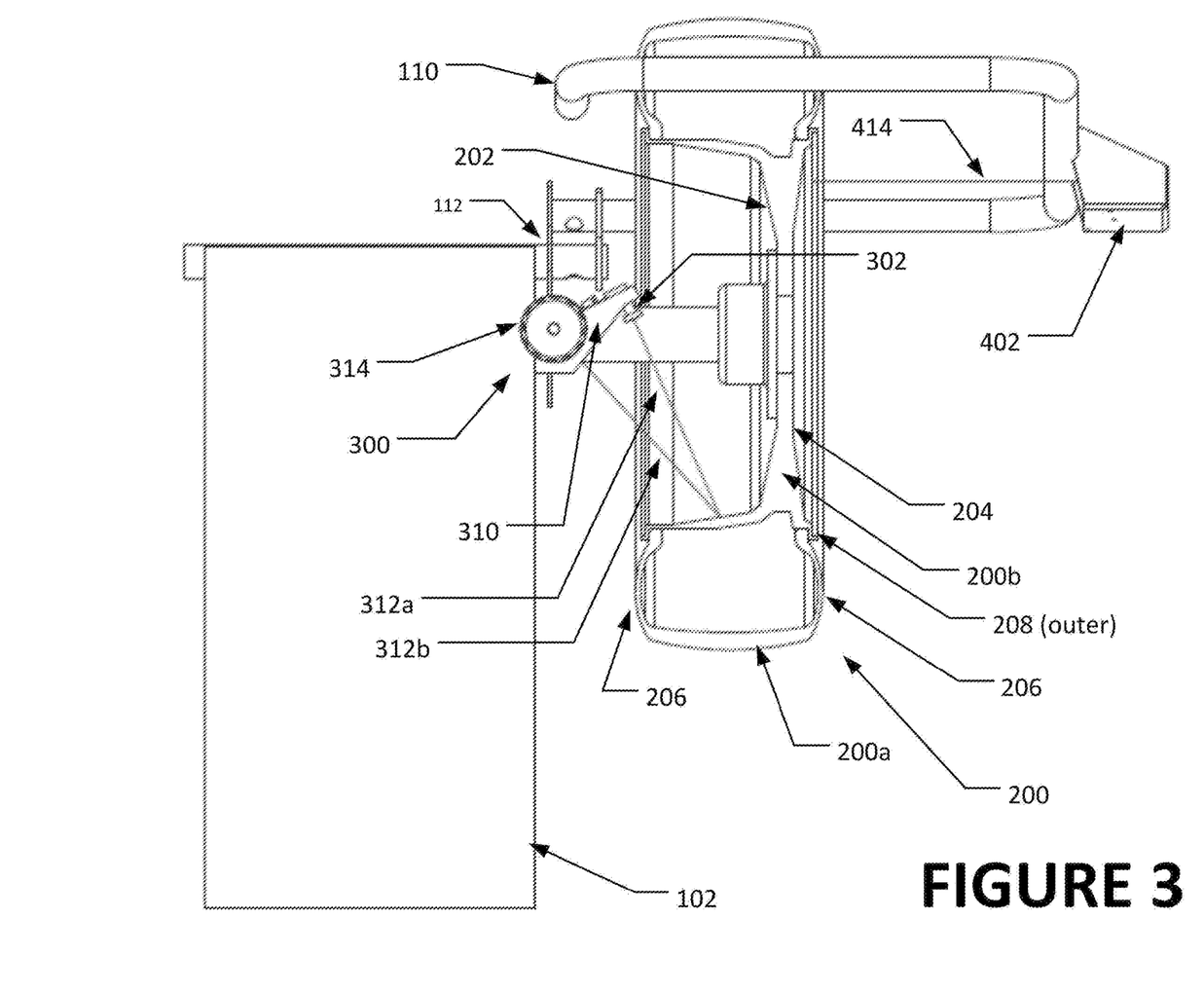
FIG. 3 is a front plan view of FIG. 2.

When a vehicle wheel assembly 200 is secured on the spindle shaft 104 in a rotationally centered position with respect to an axis of rotation for the spindle, as shown in FIGS. 2-3, one surface 202 of the vehicle wheel assembly 200 faces the base or tub 102, and is referred to as facing inboard. The opposite surface 204 of the vehicle wheel assembly 200 is referred to as facing outboard, away from the base or tub 102. Typically, a vehicle wheel assembly 200 will be secured to the spindle shaft such that the wheel assembly inside face 202 (when mounted on a vehicle) is facing inboard. Reverse mountings, while uncommon, are possible, wherein the wheel assembly 200 is secured to the spindle shaft such that the inside face 202 is disposed in the outboard position along the spindle shaft 104, facing outboard.

Figure 4:
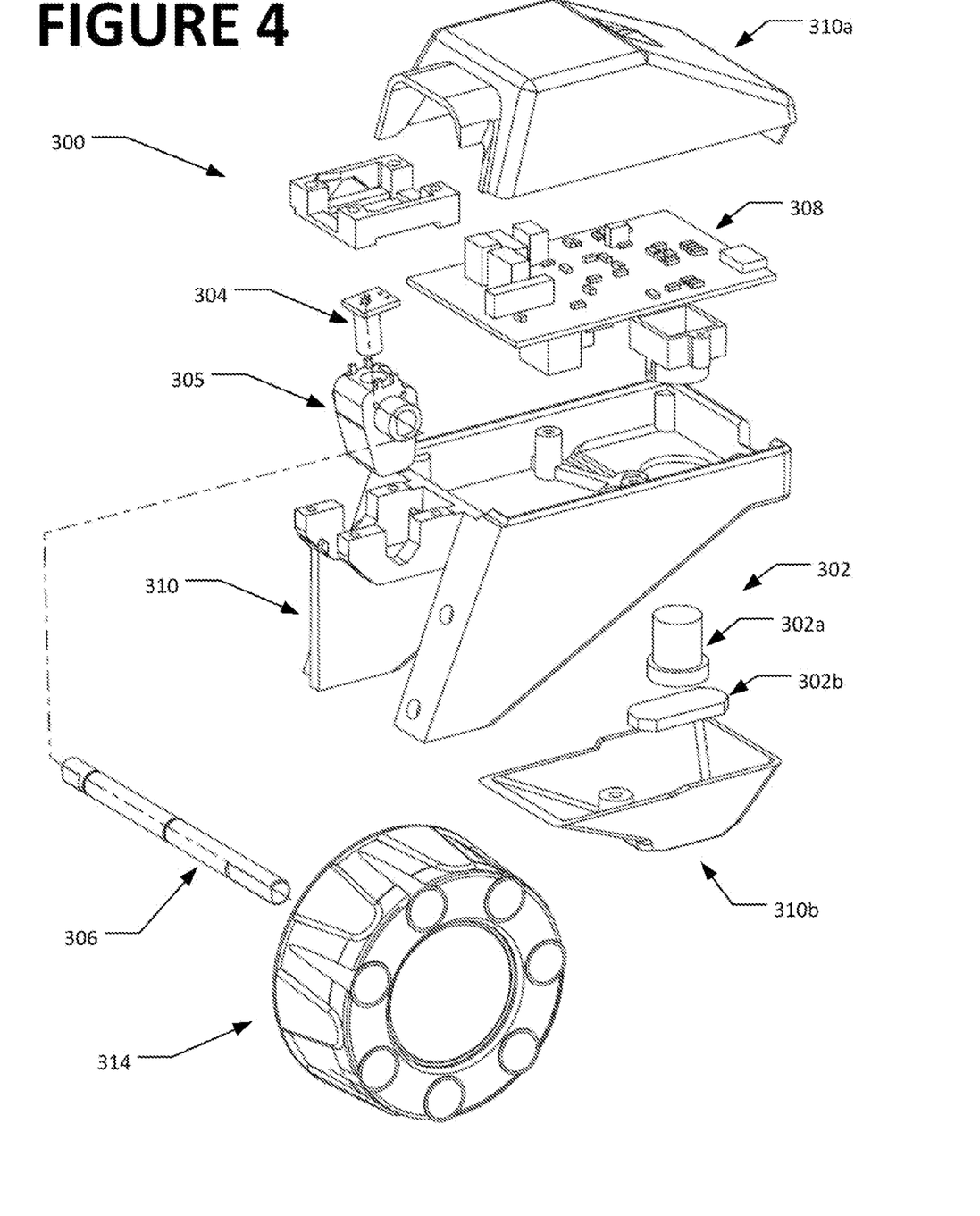
FIG. 4 is an exploded view of an inner surface non-contact measurement system.

In an embodiment of the present disclosure, the vehicle wheel balancing system 100 is provided with a non-contact measurement system 300 shown in FIG. 4, to acquire measurement data associated with the inboard surfaces 202 of a wheel assembly secured on the spindle shaft 102. The non-contact measurement system 300 includes a fixed receiver 302 having an optical detector 302a and associated optical elements 302b with a field of view, a laser emitter module 304 independently mounted in a rotational-sensor fixture 305 to a laser support shaft 306 for rotation about a longitudinal axis of the shaft 306, and control circuits 308 for operating the laser emitter and optical detector. The fixed receiver 302 and laser emitter module 304 may optionally be supported by a common mounting bracket 310 contained within upper and lower covers 310a, 310b, secured to the base or tub 102 in proximity to the spindle shaft 104, or may be mounted to the base or tub separately. When activated, the laser emitter module 304 is rotatable about an axis of the laser support shaft 306 to emit a laser beam 312a within an emission plane orthogonal to the rotational axis of the support shaft 306. Laser light 312b reflected from illuminated surfaces within the emission plane is observable within the field of view of the optical detector 302a. An adjustment knob 314 disposed adjacent to an external surface of the base or tub 102 is operatively coupled to the laser emitter module 304 to enable manual rotation of the laser emitter module about the support shaft axis 306. By rotating the adjustment knob 314 during use, an operator orients the emitted laser beam 312a within the emission plane to illuminate a desired location on a surface of the wheel assembly, such as the inboard surface 202. Alternatively, a drive motor (not shown) may be coupled to the laser emitter module 304 and controlled by the wheel balancer processor to selectively rotate the laser emitter module 304 about the axis of the support shaft 306, directing the emitted laser 312a to illuminate specific locations on the wheel assembly inboard surface 202, or sweeping the emitted laser beam 312a across a portion of the wheel assembly to scan a contour of the surfaces. The various components for rotating the laser emitter module 304 (adjustment knob 314, support shaft 306, drive motor (not shown), etc.) are configured such that once the laser emitter module 304 is rotated to emit the laser beam 312a at a desired orientation towards the wheel assembly surface 202, the laser emitter module 304 will remain at that orientation until subsequently moved by an intentional action (such as by manual rotation of the adjustment knob 314 or engagement of the drive motor if so configured).

Surfaces within the laser emission plane of the laser emitter module 304, are illuminated with the emitted laser beam 312a during operation of the non-contact measurement system 300. These surfaces include, but are not limited to, the inboard wheel surface 202, tire sidewalls 206, wheel rim edges 208, and wheel rim spokes (if present). Laser light 312b reflected from the illuminated surfaces is filtered and/or focused by the optical elements 302b onto, and received by, the optical detector 302a of the fixed receiver 302. The focused reflected light forms an illuminated spot on a light-sensitive surface of the optical detector 302a, illuminating a cluster of light-receiving elements or pixels. Control circuits 308 process the light intensity data from these illuminated pixels to calculate a spatial location of a centroid for the illuminated spot on the surface of the optical detector 302a in pixel coordinates.

Changes in the rotational position of the laser emitter module 304 about the axis of the support shaft 306, as measured by the rotational position sensor 305, alter the orientation of the emitted laser beam 312a within the emission plane, and correspondingly, the distance the emitted laser beam 312a travels before intersecting the illuminated surface, as well as the angle of incidence for the reflected laser light 312b received at the fixed optical detector 302. Accordingly, the optical path of laser light 312b reflected from the illuminated spot on the surface of the wheel assembly 200 varies with changes in the emitted laser 312a travel distance and orientation within the emission plane, altering the pixel coordinates for the calculated centroid location of the reflected light spot focused on the surface of the optical detector 302a.

During use, an operator rotates the adjustment knob 314 to direct the laser beam 312a to illuminates a desired point on a wheel assembly surface, such as an intended placement plane for an imbalance correction weight on the inboard surface 202 or a wheel rim edge 208. Orientation of the laser emitter 304 about the axis of the support shaft 306 is tracked by means of a rotary encoder or other suitable rotational position sensor fixture 305, which generates a representative rotational position output signal for communication to the control logic 308 or processor of the wheel balancer system 100. With the laser emitter 304 orientated to illuminate the desired point, the operator presses a button or actuates a foot pedal to signal the sensor module 300 to process the output of the fixed optical detector 302 and generate an output signal to the wheel balancer control logic which is representative of an angular orientation within the emission plane along which the reflected laser light 312b was received at the optical detector 302a, i.e., the incident angle. In one embodiment, the generated output signal is an analog voltage signal which varies between bounding limits, such as 0.0 and 5.0 volts, in proportion to a location of centroid in at least one pixel dimension on the surface of the optical detector 302a. The form of the output signal generated for conveyance to the wheel balancer control logic may be in any format suitable for conveying the centroid location, including a proportional digital signal, direct numerical coordinate representation, etc. The specific relationship between the generated output signal and the angular orientation may be established by calibration to test surfaces at known distances, with one or more calibration factors stored for use by the control logic or processor of the wheel balancer system 100.

Figure 5:
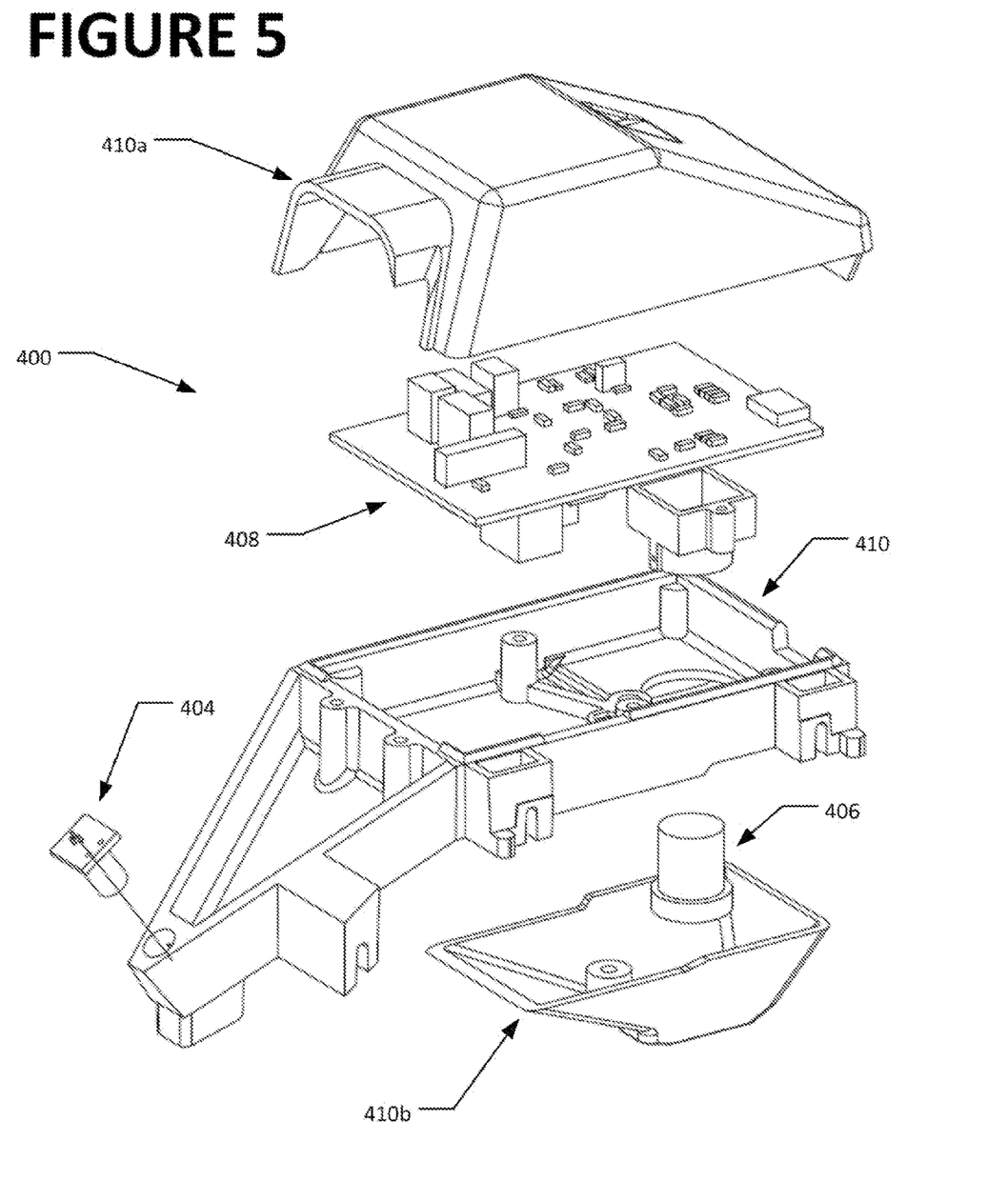
FIG. 5 is an exploded view of an outer surface non-contact measurement system.
Figure 6:
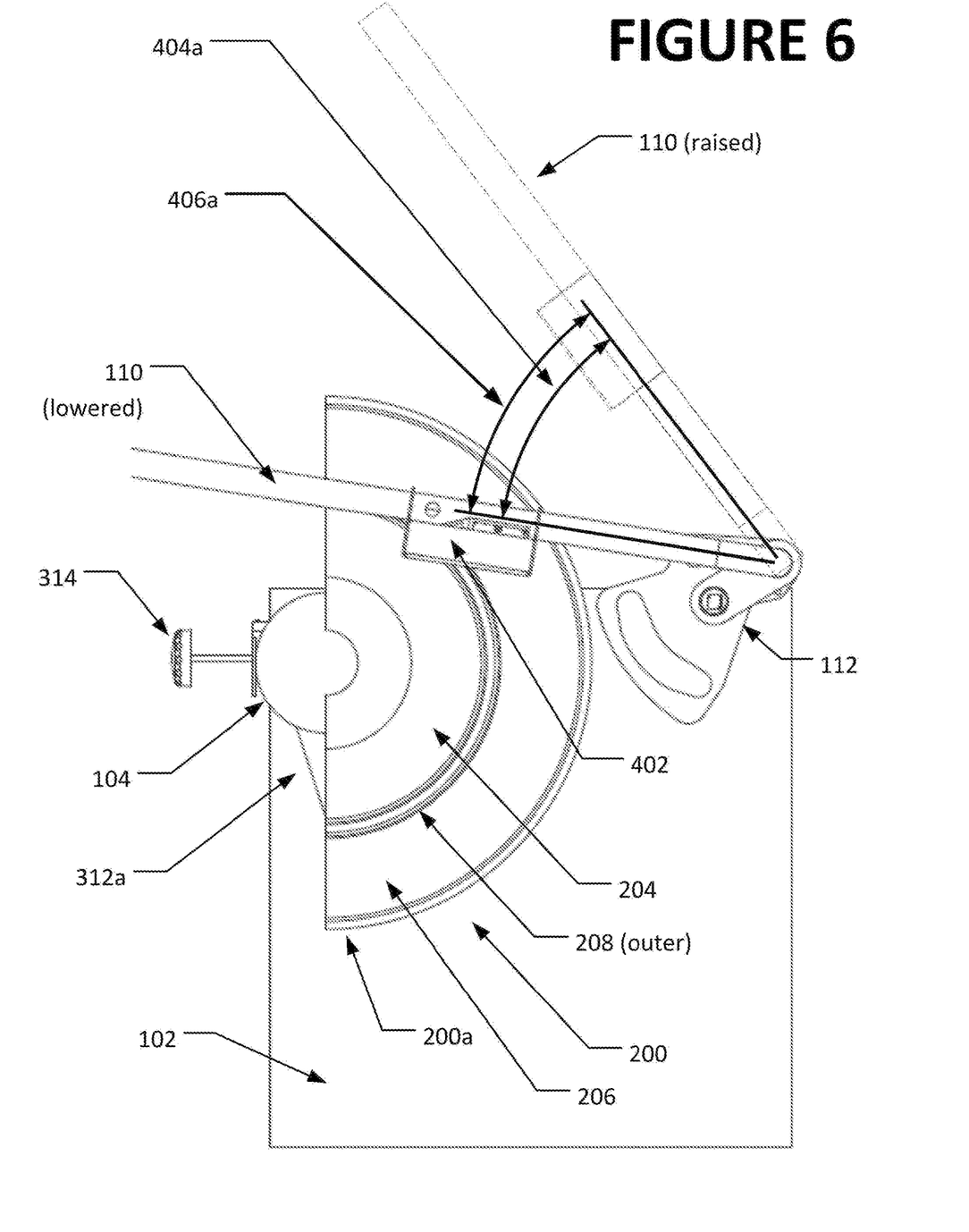
FIG. 6 is a side plan view of FIG. 2, further illustrating a range of motion for the hood support tube and associated sensor.

In a further embodiment, the vehicle wheel balancing system 100 includes a protective hood structure 108 coupled to the base 102 by a support tube 104 which is configured for arcuate movement about a hood axis by a pivot assembly 112 including a rotational position sensor. As seen in FIG. 5, the he protective hood structure 108 and support tube 110 transitions through a range of movement between a raised position clear of the wheel assembly 200 secured to the spindle shaft 104, as shown in FIG. 1, and a lowered position partially enclosing the wheel assembly 200. A second non-contact measurement system 400 is disposed on the support tube 110 within a protective enclosure 402 to acquire measurement data associated with the outboard surfaces 204 of the wheel assembly 200. As shown in FIG. 5, the second non-contact measurement system 400, or outer sensor, includes a fixed laser emitter module 404, a fixed optical receiver 406 having an optical detector and associated lens assembly with a field of view, and control circuits 408 for operating the laser emitter 404 and optical detector 406. The laser emitter module, optical detector, and control circuits may be commonly mounted to a framework 410 enclosed within an upper cover 410a and lower cover 410b, and secured within the protective enclosure 402 secured to the support tube 110, or may be independently mounted there on. Apart from the absence of a support shaft element 306 and adjustment knob 314 for rotational movement of the laser emitter module 404, the outer sensor 400 is functionally similar to the first (inner) non-contact measurement system 300 for acquiring measurement data from the inboard surfaces 202 of the wheel assembly 200. When activated, the laser emitter module 404 emits a laser beam 414 towards the wheel assembly as best seen in FIG. 3. A radial distance of the emitted laser beam 414 from the axis of the spindle shaft 104 is dependent upon the current rotational position of the hood structure about the hood axis, as illustrated in FIG. 6. The hood rotational position is monitored by a Hall-effect sensor or other suitable rotational position sensor coupled to the support shaft 104 in the pivot assembly 112, and configured to send a rotational position output signal to the control logic or processor for the wheel balancing system 100.

When a wheel assembly 200 is secured to the spindle shaft 104, lowering of the protective hood structure 108 moves the projection axis of laser emitter 404 in the second non-contact measurement system 400 through arc 404a as seen in FIG. 6, while the fixed optical receive moves through corresponding arc 406a. As the laser emitter 404 traverses arc 404a, the illuminating laser line 414 is projected across the outboard surfaces 204 of the wheel assembly 200, including a transition between the tire sidewall 206 and wheel rim edge or lip 208. Laser light reflected from a laser spot on the illuminated surfaces is focused by the associated optical elements of the optical detector 406 of the outer sensor. The focused reflected light forms an illuminated spot on a light sensitive surface of the optical detector 406, illuminating a cluster of light-receiving elements or pixels. The outer sensor control circuits 408 process the light intensity data from these illuminated pixels to calculate a spatial location of a centroid for the illuminated spot on the surface of the optical detector 406 in pixel coordinates. Since the laser emitter 404 and optical receiver 406 in the outer sensor 400 are each secured in a fixed orientation, the optical path of laser light 414 reflected from the illuminated laser spot on the wheel assembly surface varies only with changes in the laser travel distance to the illuminated surface, altering the incident angle at which the reflected laser light is received at the optical detector 406, and hence the pixel coordinates for the calculated centroid location for the spot of reflected light on the optical detector light sensitive surface.

Observations of the incident angle for the laser light 414 reflected to the imaging sensor of the outer sensor 400 are processed by the control logic or processor of the wheel balancing system 400, together with the output signal representing the rotational position of the protective hood 108, to triangulate a distance from the outer sensor 400 to the illuminated point on the outer surface 204 of the wheel assembly 200. The observations may be acquired over a range of arcuate movement for the protective hood structure 108, establishing a contour of the wheel assembly outer surface 204, or may be acquired when the protective hood structure 108 is disposed at a selected angular orientation, establishing a distance to a specific location on the wheel assembly outer surface 204 at a known radius from the axis of the spindle shaft 104, such as an outer wheel rim edge 208 for corresponding to an installation plane for an outer clip-style imbalance correction weight.

For example, when operating the wheel balancing system 100 in a clip-clip mode, wherein imbalance correction weights are to be installed only on the inner and outer wheel rim edges 208, the inboard non-contact sensor module 300 is first utilized by the operator to identify the inboard wheel rim edge 208 with the laser emitter 304, establishing the location of the inboard imbalance correction plane and the wheel rim edge radius. As the protective hood structure 108 is subsequently lowered into place over the wheel assembly 200, the second (or outer) non-contact sensor module 400 is automatically activated to acquire a distance measurement when the projection axis of laser 414 is at the measured radius for the inner wheel rim edge 208, thereby establishing the location of the outer wheel rim edge and outboard imbalance correction plane, and correspondingly, a width of the wheel rim 200 (or separation distance between in the inboard and outboard imbalance correction planes).

Figure 7:
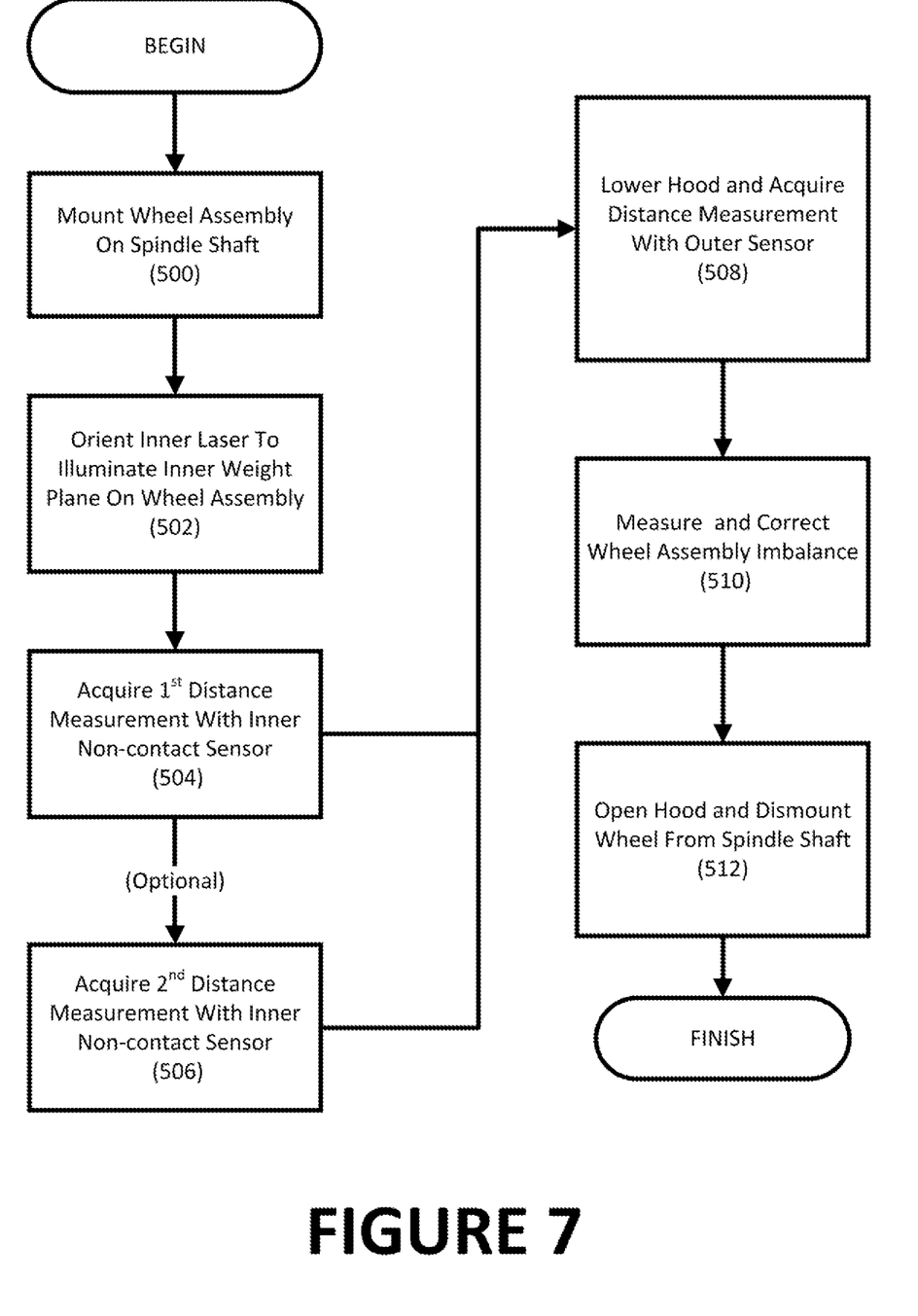
FIG. 7 is a flow chart illustrating an operating procedure for a wheel balancer system of the present disclosure.

A method for operating the wheel balancing system of the present disclosure is illustrated by the flow chart of FIG. 7. Initially, a wheel assembly 200 is mounted to the balancer spindle shaft 104 (Box 500). The operator next (at Box 502) rotates the adjustment knob 314 for the laser module 304 of the inner non-contact sensor module 300 to orient the emitted laser beam 312a to illuminate an inner or first weight plane on an inner surface 202 of the wheel assembly 200 for use with either an adhesive or clip-on imbalance correction weight. With the emitted laser beam 312a at the desired orientation, the operator triggers acquisition of a first distance measurement (Box 504). Optionally, as shown at Box 506, the operator may again rotate the adjustment knob 314 to orient the emitted laser 312a to illuminate a second weight plane on the inner surface 202 of the wheel assembly 200 for use with an adhesive imbalance correction weight, and again trigger acquisition of a distance measurement. Once the measurements are acquired with the inner non-contact sensor 300, the protective hood structure 108 is lowered (Box 508), and a distance measurement to the outer surface 204 of the wheel assembly 200 is acquired using the outer non-contact sensor module 400 as the hood movement traverses an arc across the wheel rim edge 208 transition between tire and wheel rim. The distance measurement from the outer non-contact sensor module defines a wheel rim width dimension, and an outer imbalance correction weight plane for use with a clip-on imbalance correction weight. With the measurements of the wheel assembly dimension and weight placement planes completed, a wheel imbalance measurement spin cycle is completed and any necessary imbalance correction weights applied in a traditional manner. (Box 510). Finally, at Box 512, the operator completes the imbalance correction procedure for the wheel assembly, raises the hood structure 108, and removes the wheel assembly 200 from the spindle shaft 104.

In further embodiments, the wheel balancer control logic may utilize information obtained from the inner and outer non-contact sensor modules 300, 400 to provide warnings to an operator during operation of the wheel balancer system 100. For example, since the laser emitter 304 of the inner sensor module 300 remains oriented towards the wheel assembly 200 inner surface 202 until changed by an operator, data from the inner sensor module 300 may be utilize as illustrated in the flow chart of FIG. 8 to warn an operator if measurement of a wheel dimension has not been completed before attempting to measure an imbalance in the wheel assembly 200. The wheel balancer control logic may be configured with suitable software instructions to compare a "last measured" distance based on data from the inner sensor module 300 with a "current" distance before activating a drive motor to rotate the spindle shaft 104 and a wheel assembly 200 mounted there on. If the comparison indicates a change in distance exceeding an acceptable tolerance, it is likely a new wheel assembly 200 has been mounted to the spindle shaft 104, and a new set of measurements should be acquired.

Figure 8:
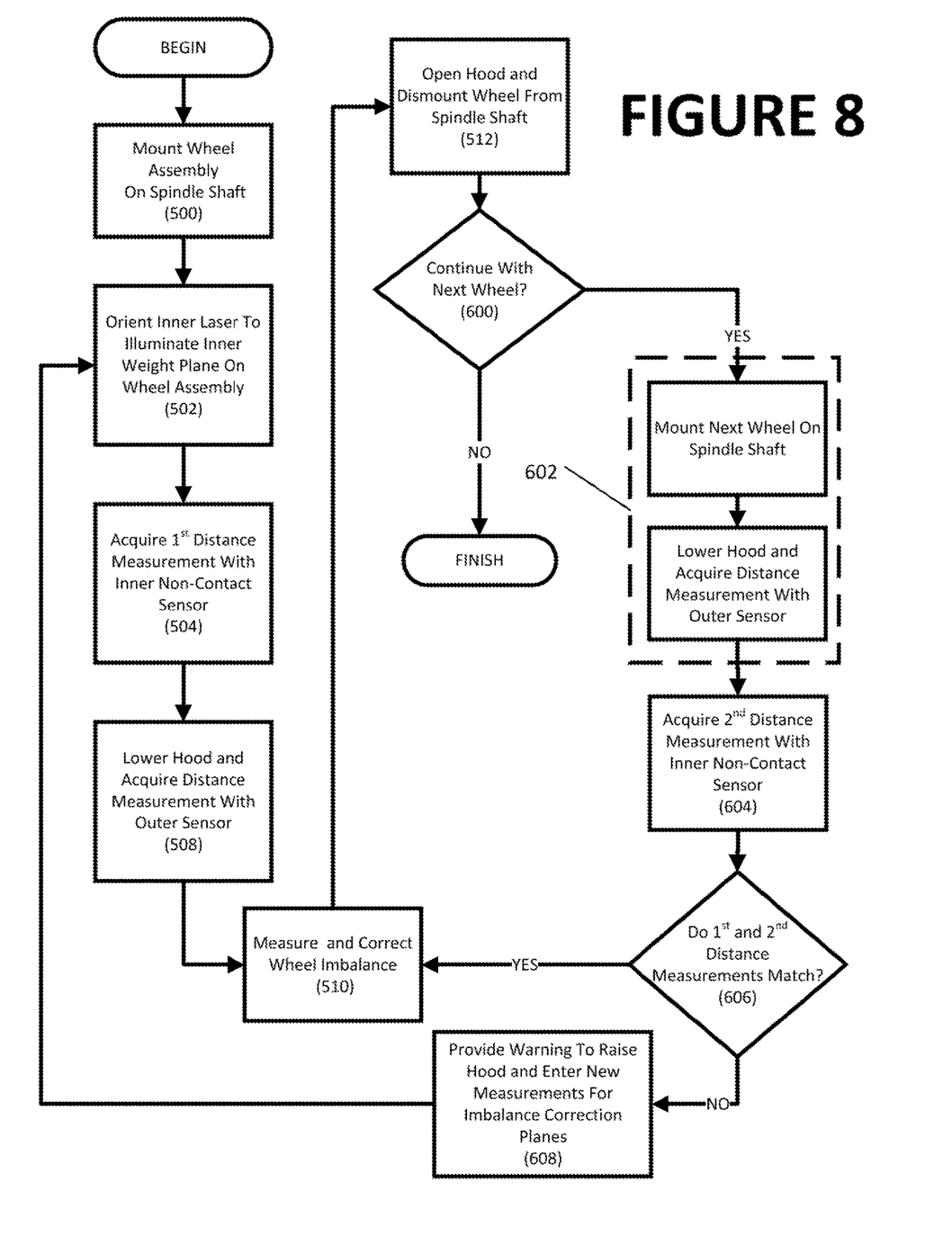
FIG. 8 is a flow chart illustrating an alternate operating procedure for a wheel balancer system of the present disclosure.

Once a wheel assembly 200 is mounted to the balancer spindle shaft (Box 500), an exemplary implementation of this process may include the following steps:

i. The operator rotates the adjustment knob 314 for the laser module 304 of the inner non-contact sensor module (Box 502), and then triggers acquisition of the first distance measurement (Box 504).

ii. The adjustment knob 314 remains in the position from which the last distance measurement as acquired.

iii. The protective hood structure 108 is lowered (Box 508).

iv. Measurement data associated with an outer surface 204 of the wheel assembly 200 is acquired using the outer non-contact sensor module 400 (Box 508).

v. A wheel imbalance measurement spin cycle is then completed and any necessary imbalance correction weights applied. (Box 510).

vi. At this stage, the laser emitter 304 from the inner non-contact sensor module 300 remains pointed at the last inner weight plane that was identified by turning the adjustment knob 314 (a benefit of not returning the adjustment knob to a "home" position).

vii. The operator completes the balancing procedure for the wheel assembly 200 by raising the protective hood structure 108 and removing the wheel assembly 200 from the balancer spindle shaft 104 (Box 512).

viii. If the operator elects to continue imbalance correction procedures for another wheel, (Box 600) the next wheel assembly 200 is secured to the balancer spindle shaft 104, and the protective hood structure 108 is lowered without the operator triggering acquisition of any distance measurements from the inner non-contact sensor 300 (Box 602), but while automatically acquiring distance measurement data from the outer non-contact sensor module 400.

ix. Before starting the spindle drive motor to rotate the spindle shaft 104 and wheel assembly 200, the inner non-contact sensor module 300 is activated automatically to measure a distance to the inner plane of the wheel along the current orientation of the laser emitter 304 which is unchanged from the last measurement acquired for the previous wheel assembly 200. (Box 604).

x. A comparison is made between the measured inner (and optionally, outer) distances with the measured distance (s) acquired the last time the measurement acquisition was triggered by the operator (Box 606).

xi. If a dimension has changed, the balancer control logic generates a warning message to the operator of the need to re-measure wheel assembly dimensions (Box 608), after which new measurements are acquired (Box 502) and the process repeated.

xii. If all compared dimensions remain unchanged to within an acceptable tolerance, the wheel assembly 200 imbalance is measured and corrected without the need for further data entry. (Box 510).

Distance measurements acquired by the inner and outer non-contact sensor modules 300, 400 may be utilized to provide additional functionality to the wheel balancer system 100. For example, if the control logic of the wheel balancer system 100 is configured with software instructions to acquire periodic measurements of distance from the inner non-contact sensor module 300, removal of a wheel assembly 200 previously secured to the spindle shaft 104 can be detected by identifying a significant change in the measured distance without any accompanying change in the orientation of the laser emitter 304. This change is a result of the wheel assembly 200 having been removed from the spindle shaft 104, such that the emitter laser 312*a* strikes the floor or some other distant surface instead of the wheel assembly inner surface 202.

Using a similar procedure during rotation of a wheel assembly 200 secured to the spindle shaft 104, the control logic of the wheel balancer system 100 may be configured with software instructions to detect a miss-centered mounting of the wheel assembly 200 or an out-of-round damage condition for the wheel assembly. With the inner laser emitter 304 oriented to illuminate a point on the wheel assembly inner surface 202, periodic distance measurements are acquired as the wheel assembly 200 is rotated about the axis of the spindle shaft 104. Changes in the periodic distance measurements, without any accompanying changes in an orientation of the laser emitter 304, such as by rotation of the adjustment knob 314, are indicative of either a miss-centered mounting or potential wheel rim damage due to an out-of-round condition. Upon detection of such a condition, the wheel balancer system may be configured to provide the operator with a suitable warning.

If the control logic of the wheel balancer system 100 is provided with suitable software instructions, the laser emitter 304 of the inner non-contact sensor 300 may be utilized to aid an operator in proper placement of an imbalance correction weight on the wheel assembly surface 202. For example, following an imbalance correction spin of the wheel assembly 200, the control logic for the wheel balancer 100 may be configured with software instructions to calculate one or more imbalance correction weight amounts for placement at specific rotational and axial positions about the wheel assembly 200 as is convention in the art. The operator is responsible for applying the correct amount of imbalance correction weight at the required locations. The control logic for the wheel balancer system 100 can be configured with software instructions to control the rotational position of the wheel assembly 200 on the axis of the spindle shaft 104, and to rotate the wheel assembly 200 such that the axial plane in which an imbalance correction weight is to be applied to the wheel assembly 200 is aligned with the emission plane of the inner laser emitter 304, such that a laser beam 312*a* projected from the laser emitter 304, at the correct orientation, will strike the inner surface 202 of the wheel assembly 200 at a location for placement of an imbalance correction weight.

If the adjustment knob 314 or shaft 306 for the laser emitter 304 is coupled to a motorized drive under control of the control logic, or alternatively is mounted to a motor-controlled gimbal systems for controlled rotation about at least one axis, the control logic can automatically rotate the laser emitter 304 to the correct orientation at which to project the emitted the laser beam 312*a*. Alternatively, if the laser emitter 304 is coupled to the adjustment knob 314 for only manual rotation, the control logic may be configured to provide the operator with visual guidance for rotating the adjustment knob 314 to orient the laser emitter 304 at the correct orientation to illuminate the weight placement location. For example, the laser emitter 304 may be controlled to pulse the laser 312*a* at a varying rate proportional to the orientation at which the beam is emitted. A faster pulse indicates the orientation is near the target, while a slower pulse indicates it is further from the target. Once the orientation is on target (to within a tolerance), the laser emitter 304 may be controlled to emit the laser beam 312*a* in a steady-state configuration, illuminating the desired placement location on the wheel assembly inner surface 202. It will of course, be recognized that variety of other methods may be utilized to aid the operator in adjusting an orientation of the laser emitter 304 to align with a placement location on the wheel assembly 200 for an imbalance correction weight.

In a further embodiment, a review of the distance measurements acquired by the inner non-contact sensor module 300 in response to operator input commands can be utilized by the control logic of the wheel balancer system 100 to identify the particular mode of imbalance correction intended by the operator. Modes of imbalance correction can include a clip-clip mode, a tape-tape mode, or a clip-tape mode, with "clip" or "tape" referring to the type of imbalance correction weight to be installed on the wheel assembly 200 at the inner and outer imbalance correction planes. When utilizing a clip-clip mode, the operator will only be required to utilize the inner non-contact sensor module 300 to designate a single imbalance correction weight location, i.e., the inner wheel rim edge 208. The outer weight placement location will be measured automatically during the lowering of the protective hood structure 108, at the same radial dimension as identified with the inner non-contact sensor module 300.

If the operator intends to utilize either a tape-tape mode, or a clip-tape mode, imbalance weights will be placed in two different imbalance correction planes on the inboard side of the wheel assembly 200, necessitating acquisition of two different measurements from the inboard non-contact sensor module 300. With a tape-tape mode, weights will be placed on the inner surfaces 202 of the wheel rim 208, at two different axial positions, and will likely be at similar radial dimensions. Accordingly, the control logic of the wheel balancer system 100 may be configured with software instructions to detect when two sequential measurements from the inner non-contact sensor module 300, at different orientations of the laser emitter 304, identify locations on the wheel rim surface 202 having similar radial dimensions, and thereby automatically select the tape-tape imbalance correction mode.

In contrast, for a clip-tape mode, one imbalance correction weight will be secured to the inner wheel rim edge 208, and the other to the inner surface 202 of the wheel rim. The inner wheel rim edge 208 and inner wheel surface locations will be at different radial dimensions. Accordingly, the control logic of the wheel balancer system 100 may be configured to detect when two sequential measurements from the inner non-contact sensor module 300, at different orientations of the laser emitter 304, identify locations on the wheel assembly 200 having radial dimensions which differ by more than a limit, and thereby automatically select the clip-tape imbalance correction mode.

Those of ordinary skill in the art will recognize that inner and outer sensor module distance measurement data may be utilized to achieve a variety of additional functions for the wheel balancer system 100, similar to features and functionality obtained using measurements of a wheel assembly obtained from traditional mechanical dataset arms.

While the present disclosure has described various embodiments in which the outer non-contact sensor module 400 consists of a fixed laser emitter 404 in conjunction with a fixed optical detector 406, it will be understood that fixed laser emitter 404 may be replaced by a laser emitter configured for rotation about at least one axis, similar to laser emitter 304, either under manual or automated control. For example, the fixed laser emitter 404 may be replaced by gimbal-mounted laser emitter configured for rotational movement about at least one axis of rotation in response to commands from the control logic of the wheel balancer system 100. Providing rotational movement of the laser emitter 404 in the outer non-contact sensor module 400 provides a means by which the emitted laser beam 414 may be selectively positioned or swept across outer surfaces 204 of the wheel assembly 200 without the need to rotate or reposition the protective hood structure 108.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. An apparatus for optically measuring a wheel assembly secured coaxially on a spindle shaft of a wheel balancing system having a base structure supporting the spindle shaft and a processor configured to operate the wheel balancing system, the apparatus comprising:

a non-contact sensor secured to the base structure, said non-contact sensor including a stationary optical sensor having a field of view directed along a fixed orientation, control logic, and a laser emitter mounted on a laser support shaft for rotational movement, said laser emitter aligned to project a laser beam towards an inboard surface of the wheel assembly within said optical sensor field of view;

an adjustment mechanism operatively coupled to the laser emitter to rotate said laser emitter about an axis of said support shaft, independent of said stationary optical sensor, wherein an orientation of the laser beam within an emission plane is responsive to a rotational position of the laser emitter;

wherein said control logic is configured to receive output from said stationary optical sensor responsive to a pixel position on a light sensitive surface of said stationary optical sensor illuminated by a spot of reflected laser light from a point on said inboard surface illuminated by said laser beam rotated within said emission plane; and wherein said control logic is further configured to utilize and said output from said stationary optical sensor to generate to said processor, an output signal which is representative of an incident angle at said stationary optical sensor for said reflected laser light from said inboard surface.

2. The apparatus of claim 1 wherein said control logic is responsive to an operator-triggered input signal to generate said output signal representative of said incident angle.

3. The apparatus of claim 1 further including a rotational position sensor associated with said laser emitter, said rotational position sensor configured to generate a second output signal to said processor, said second output signal representative of a rotational position of said laser emitter about an axis of said shaft.

4. The apparatus of claim 1 wherein said adjustment mechanism is a manually-operable adjustment knob.

5. The apparatus of claim 1 wherein said adjustment mechanism includes a drive motor responsive to output from said processor to alter an orientation of said laser emitter about said axis of said shaft.

6. An apparatus for optically measuring a wheel assembly secured coaxially on a spindle shaft of a wheel balancing system, the wheel balancing system having a base structure supporting the spindle shaft, a protective hood structure secured to the base on a hood support shaft for arcuate motion about a hood axis between an open position clear of the wheel assembly and a closed position partially enclosing the wheel assembly, and a processor configured to operate the wheel balancing system, the apparatus comprising:

an inner non-contact sensor secured to the base structure, said inner non-contact sensor including a first optical sensor having a first field of view directed in a fixed orientation, first control logic, and a first laser emitter mounted on a support shaft for movement independent of the first optical sensor, said first laser emitter aligned to project a first laser beam towards an inboard surface of the wheel assembly within said first field of view;

wherein said first control logic is configured to receive output from said first optical sensor responsive to a pixel position on a light-sensitive surface of said first optical sensor for a first spot of laser light reflected from a point on said inboard surface illuminated by said first laser beam within a first emission plane;

wherein said first control logic is further configured to utilize and said output from said first optical sensor to generate a first output signal to said processor which is representative of an incident angle at said first optical sensor for said reflected laser light from said inboard surface;

an outboard non-contact sensor secured to the protective hood structure, said outboard non-contact sensor including a second optical sensor having a second field of view directed in a fixed orientation relative to said hood axis, second control logic, and a second laser emitter, said second laser emitter configured to project a second laser beam towards an outboard surface of the wheel assembly along an axis having a fixed orientation relative to said hood axis;

wherein said second control logic is configured to receive output from said second fixed optical sensor responsive to a pixel position on a light-sensitive surface of said second optical sensor for a second spot of laser light reflected from a point on said outboard surface illuminated by said second laser beam; and wherein said second control logic is further configured to utilize said output from said second optical sensor to generate a second output signal to said processor which is representative of an incident angle at said second optical sensor for said reflected laser light from said outboard surface.

7. The apparatus of claim 6 further including a rotational position sensor associated with said first laser emitter, said rotational position sensor configured to generate a rotational position output signal to said processor, said rotational position output signal representative of a rotational position of said first laser emitter about said support shaft axis.

8. The apparatus of claim 6 wherein said first control logic is responsive to an operator-triggered input signal to generate said first output signal representative of said incident angle of said light reflected from said inboard surface; and wherein said second control logic is responsive to a processor-triggered input signal to generate said second output signal representative of said incident angle of said light reflected from said outboard surface.

9. The apparatus of claim 6 further including a rotational position sensor associated with said protective hood structure, said rotational position sensor configured to generate a hood position output signal to said processor representative of a rotational position of said hood support shaft about said hood axis; and wherein said processor-triggered input signal is associated with said rotational position of said support shaft about said hood axis.

10. An apparatus for optically measuring a wheel assembly secured coaxially on a spindle shaft of a wheel balancing system, the wheel balancing system having a base structure supporting the spindle shaft, a protective hood structure secured to the base on a support shaft for arcuate motion about a hood axis between an open position clear of the wheel assembly and a closed position partially enclosing the wheel assembly, and a processor configured to operate the wheel balancing system, the apparatus comprising:

a non-contact sensor secured to the protective hood in a position to travers an arcuate path during said arcuate motion of said hood, said non-contact sensor including an optical sensor having a field of view oriented towards an outboard surface of the wheel assembly along an axis fixed relative to said hood axis, and a laser emitter oriented to project a laser beam towards said outboard surface of the wheel assembly along a projection axis fixed relative to said hood axis;

control logic associated with said non-contact sensor, said control logic configured to receive output from said fixed optical sensor responsive to a pixel position on a light-sensitive surface of said optical sensor of a spot of laser light reflected from a point on said outboard surface illuminated by said laser beam; and wherein said control logic is further configured to utilize said output from said optical sensor to generate an output signal to said processor which is representative of an incident angle at said optical sensor for said reflected laser light from said outboard surface.

11. The apparatus of claim 10 wherein said control logic is responsive to a processor-triggered input signal to generate said output signal representative of said incident angle of said light reflected from said outboard surface.

12. The apparatus of claim 11 further including a rotational position sensor associated with said protective hood structure, said rotational position sensor configured to generate a hood position output signal to said processor representative of a rotational position of said support shaft about said hood axis; and wherein said processor-triggered input signal is associated with said rotational position of said support shaft about said hood axis.

13. A method for optically measuring a vehicle wheel assembly secured on a spindle shaft of a wheel balancing system, the method comprising the steps of:

rotating, independent of a stationary optical detector, a laser emitter about an axis of a support shaft to intersect a projected laser beam with an inboard surface of the vehicle wheel assembly to illuminate a point on said inboard surface within a field of view of said stationary optical detector;

receiving, at a light-sensitive surface of said stationary optical detector, laser light reflected from said illuminated point on said inboard surface to identify an incident angle of said reflected laser light;

generating an output signal from a rotational position sensor representative of a rotational position of the laser emitter about an axis of said support shaft associated with said received reflected laser light; and determining, using said identified incident angle of said reflected laser light and said rotational position sensor output signal, at least one linear distance associated with said illuminated point on said inboard surface.

14. The method of claim 13 wherein said at least one linear distance is a radial displacement of said illuminated point on said inboard surface from an axis of said spindle shaft.

15. The method of claim 13 further including manual rotation of said laser emitter about said axis of said support shaft to illuminate a selected point on said inboard surface of said wheel assembly within said emission plane.

16. The method of claim 15 wherein said selected point is located on an inboard rim edge of said vehicle wheel assembly.

17. The method of claim 15 wherein said selected point is located within an imbalance correction plane of said vehicle wheel assembly.

18. A method for optically measuring a vehicle wheel assembly secured on a spindle shaft of a wheel balancing system, the method comprising the steps of:

acquiring measurements from an inboard surface of the vehicle wheel assembly with an inner non-contact measurement sensor including a laser emitter mounted on a support shaft for rotating an emitted a laser beam within an emission plane intersecting said inboard surface;

receiving, at a light-sensitive surface of an optical detector having a fixed field of view oriented towards said inboard surface, laser light reflected from said inboard surface to identify an incident angle of said reflected laser light;

generating an output signal from a rotational position sensor representative of a rotational position of the laser emitter about an axis of said support shaft;

determining, using said identified incident angle of reflected laser light and said rotational position sensor output signal, at least one linear distance associated with a point on said inboard surface illuminated by said emitted laser beam;

acquiring measurements from an outboard surface of the vehicle wheel assembly, said measurements acquired with an outer non-contact measurement sensor secured to a protective hood structure for traversing an arcuate path during opening and closing of said protective hood structure;

wherein said measurement acquisition includes emitting a laser beam from a fixed laser emitter within said outer non-contact measurement sensor towards said outboard surface, and receiving laser light reflected from said outboard surface at a light-sensitive surface of an optical detector to identify an incident angle of said reflected laser light; and determining, using said identified incident angle of reflected laser light from said outboard surface, together with a known configuration of said fixed laser emitter and optical detector within said outer non-contact measurement sensor, at least one linear distance associated with a point on said outboard surface illuminated by said emitted laser beam.

19. The method of claim 18, further including:

generating an output signal representative of a rotational position of the protective hood structure about an axis of a hood support shaft; and wherein determining said at least one linear distance associated with a point on said outboard surface is responsive to said output signal identifying when said fixed laser emitter of said outer rotational position sensor is positioned on said arcuate path to emit said laser beam along an axis parallel to, and displaced at a selected radial distance from, a rotational axis of said spindle shaft.

20. The method of claim 19 wherein said selected radial distance is identified by an operator utilizing said inner non-contact measurement sensor to illuminate a point on said inboard surface of said wheel assembly.

* * * * *

UNITED STATES PATENT AND TRADEMARK OFFICE
CERTIFICATE OF CORRECTION

PATENT NO. : 11,015,920 B2
APPLICATION NO. : 16/642761
DATED : May 25, 2021
INVENTOR(S) : William B. Feero and Joel A. Clasquin It is certified that error appears in the above-identified patent and that said Letters Patent is hereby corrected as shown below:

In the Claims

Claim 1, Column 12, Line 12; delete the word "and"

Claim 6, Column 12, Line 57; delete the word "and"

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*